United States Patent
Giriyappa et al.

(10) Patent No.: US 12,047,474 B1
(45) Date of Patent: Jul. 23, 2024

(54) METHOD AND SYSTEM FOR PARALLEL CONTENT DOWNLOAD

(71) Applicant: Open Text Holdings, Inc., Menlo Park, CA (US)

(72) Inventors: Venkatesh Nandikalkere Giriyappa, Bangalore (IN); Sumi Viswanathan, Bangalore (IN); Roginy Balasubramanian, Hosur (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 18/183,850

(22) Filed: Mar. 14, 2023

(51) Int. Cl.
G06F 15/16 (2006.01)
G06F 3/01 (2006.01)
H04L 43/0852 (2022.01)
H04L 67/61 (2022.01)
H04N 21/238 (2011.01)
H04N 21/845 (2011.01)

(52) U.S. Cl.
CPC .......... H04L 67/61 (2022.05); H04L 43/0852 (2013.01)

(58) Field of Classification Search
CPC ............................ H04L 67/61; H04L 43/0852
See application file for complete search history.

(56) References Cited

U.S. PATENT DOCUMENTS

| | | | |
|---|---|---|---|
| 8,352,956 B1 * | 1/2013 | Kishore | G06F 11/3419 718/101 |
| 9,258,343 B2 * | 2/2016 | Lai | H04L 65/60 |
| 2006/0179153 A1 * | 8/2006 | Lee | H04L 67/60 709/231 |
| 2008/0104170 A1 * | 5/2008 | Ananthanarayanan | H04L 69/14 709/204 |
| 2010/0107078 A1 * | 4/2010 | Hayashi | H04N 21/4334 709/232 |
| 2014/0164574 A1 * | 6/2014 | Gao | H04L 67/06 709/219 |
| 2014/0269736 A1 * | 9/2014 | Kasztenny | H04B 3/54 370/400 |
| 2014/0297735 A1 * | 10/2014 | Aoyagi | H04L 67/1063 709/203 |
| 2016/0050155 A1 * | 2/2016 | Liu | H04L 67/2871 370/235 |
| 2017/0223361 A1 * | 8/2017 | Blomqvist | H04N 19/15 |
| 2019/0158936 A1 * | 5/2019 | Peng | H04N 21/8456 |
| 2021/0037071 A1 * | 2/2021 | Schoenwald | H04L 67/06 |
| 2021/0357473 A1 * | 11/2021 | Zheng | H04L 67/61 |

* cited by examiner

Primary Examiner — Abdullahi E Salad
(74) Attorney, Agent, or Firm — Sprinkle IP Law Group

(57) ABSTRACT

A computer-implemented method for parallel downloading of content includes connecting to a server through which a content is available, starting to download the content from the server to a client computer, determining whether to split the downloading of the content based on a set of factors, the set of factors comprising a network latency metric and a remaining download time to download a remaining amount of the content and based on a determination to split the downloading of the content, and in parallel to downloading a first part of the content from the server to the client computer, connecting to the server and downloading an additional part of the content from the server to the client computer.

17 Claims, 5 Drawing Sheets

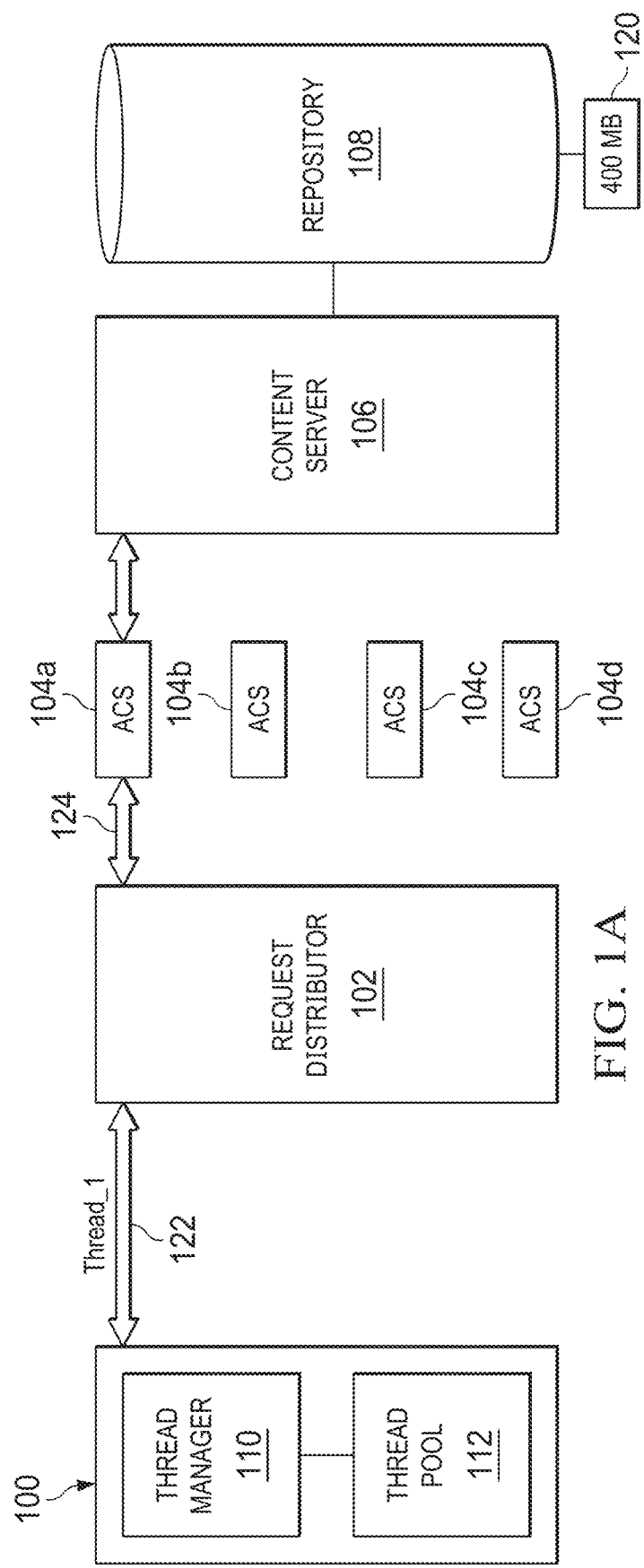

METHOD AND SYSTEM FOR PARALLEL CONTENT DOWNLOAD

TECHNICAL FIELD

This disclosure relates generally to data storage. More particularly, this disclosure relates to methods and systems for downloading content parts in parallel.

BACKGROUND

Some content management systems allow a client to download different segments of a file in parallel using multiple threads. However, the mechanisms for spawning new threads to participate in the parallel download of a piece of content can result in the client spawning unnecessary threads. Therefore, what is desired are more efficient mechanisms to create and allocate threads for the parallel downloading of content to a client.

SUMMARY

Embodiments provide methods, systems, and related computer-readable media for parallel downloading of content. According to one general aspect of this disclosure, a computer-implemented method for parallel downloading is provided. The method includes connecting to a server through which a content is available, starting to download the content from the server to a client computer and determining whether to split the downloading of the content based on a set of factors, where the set of factors comprise a network latency metric and a remaining download time to download a remaining amount of the content. The method further includes downloading an additional part of the content from the server to the client computer in parallel to downloading a first part of the content based on a determination to split downloading of the content.

Another aspect of the present disclosure includes a computer program product comprising a non-transitory, computer-readable medium storing instructions executable by a processor to perform parallel downloading. More particularly, the non-transitory, computer-readable medium comprises instructions for connecting to a server through which a content is available, starting to download the content from the server to a client computer and determining whether to split the downloading of the content based on a set of factors, where the set of factors comprising a network latency metric and a remaining download time to download a remaining amount of the content. The non-transitory, computer-readable medium further comprises instructions for, based on a determination to split the downloading of the content, and in parallel to downloading a first part of the content from the server to the client computer, connecting to the server and downloading an additional part of the content from the server to the client computer.

Yet another aspect of the present disclosure comprises a plurality of servers through which a content is accessible and a client computer. The client computer stores a client application that is executable by the client computer. The client application includes instructions for connecting to a first server of the plurality of servers, starting to download the content from the first server to the client computer, and determining whether to split the downloading of the content based on a set of factors, where the set of factors comprising a network latency metric and a remaining download time to download a remaining amount of the content. The client application further includes instructions for, based on a determination to split the downloading of the content, and in parallel to downloading a first part of the content from the server to the client computer, connecting to a second server and downloading an additional part of the content from the second server to the client computer.

Various embodiments include one or more of the following features. Connecting to the server and downloading the first part of the content is performed by a first thread, and connecting to the server and downloading the additional part of the content from the server is performed by a parallel thread that executes in parallel with the first thread. The parallel thread is created based on the determination to split the downloading of the content. The determination to split the downloading of the content comprises a determination that the remaining download time exceeds a threshold download time.

The network latency metric comprises a connection time for connecting to the server and where the connection time is used as the threshold download time. The network latency metric comprises a connection time for connecting to the server and the set of factors further comprises a download speed and the determination to split the downloading of the content comprises a determination that the remaining download time exceeds an estimated download time to download the remaining amount of the content by splitting the downloading of the content.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1A is a diagrammatic representation of one embodiment of a content management platform using a thread.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

As mentioned, some mechanisms for spawning new threads for downloading content result in creating unnecessary threads. Embodiments of the present disclosure include mechanisms for splitting the downloading of content between threads that reduces or eliminates the use of unnecessary threads by accounting for factors such as network latency and remaining download time of threads already downloading the content.

Figure 1B:
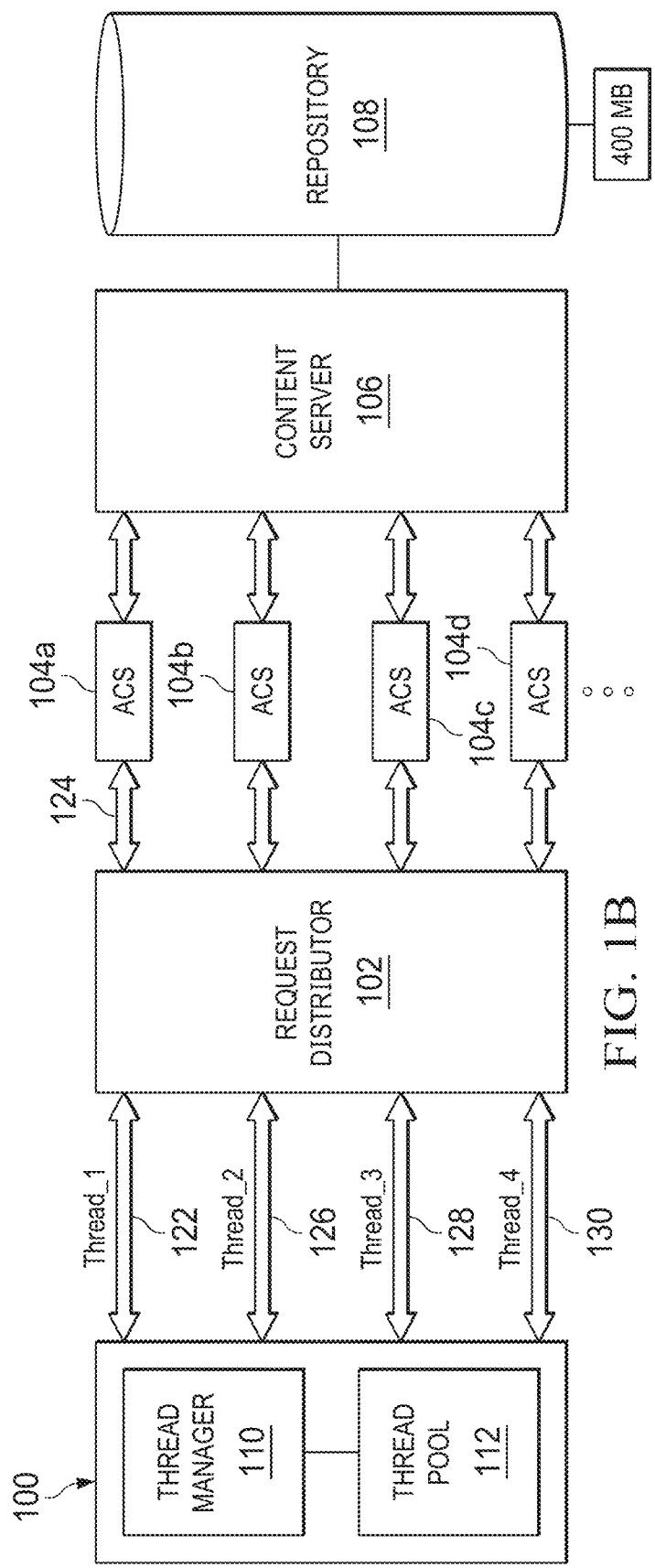
FIG. 1B is a diagrammatic representation of one embodiment of a content management platform using additional threads.

FIG. 1A and FIG. 1B are diagrammatic representations of one embodiment of a content management platform. The content management platform comprises a client application 100, a request distributor 102, accelerated content services (ACS) servers (ACS server 104*a*, ACS server 104*b*, ACS server 104*c*, ACS server 104*d* are illustrated), and a content server 106 that manages a repository 108 of content.

Client application 100 is an application on a client that can download content (e.g., content objects, files or other content) from content server 106. Client application 100 includes a thread manager 110 to manage a thread pool 112 of threads. Thread manager 110 creates threads based on various factors. Example factors include, but are not limited to, file size, network speed, and number of CPUs.

Content server 106 comprises software that manages, protects, and imposes an object-oriented structure on the information in repositories, such as repository 108. Content server 106 provides tools for managing the lifecycles of that information and automating processes for manipulating it.

According to one embodiment, repository 108 comprises a metadata database (e.g., a relational database or other type of database) and a place to store files (e.g., one or more local or remote storage areas). The content files (e.g., word processing files, spreadsheet files, image files, or other files) in the repository can reside in various storage elements depending on the configuration of the repository. Example storage elements include, but are not limited to, local file systems local to content server 106, networked file systems, content databases, and ReST-based stores, including cloud-based stores.

Each of ACS server 104*a*, ACS server 104*b*, ACS server 104*c*, ACS server 104*d* is an instance of a light-weight server. Each ACS server reads and writes content from content server 106 for web-based client applications. According to one embodiment, each ACS server has a respective uniform resource identifier, such as a uniform resource locator (URL), to which requests for the ACS server can be directed.

In the embodiment illustrated, the ACS servers are behind request distributor 102. Request distributor 104 distributes requests from client application 100 to the ACS servers, which read the requested data from content server 106. In one embodiment, request distributor 102 is implemented as a portion of a load balancer running on the premises of a customer utilizing the content server 106 for managing content—that is, request distributor 102 is part of an on-premises load balancer. In another embodiment, request distributor 102 is implemented as part of a cloud service, such as an ingress service.

According to one embodiment, request distributor 102 has a respective uniform resource identifier to which requests to the request distributor 102 can be directed. Further, request distributor 102 is configured with or can access the URLs of the ACS servers. Content server 106 is configured with the URLs or other identifiers for request distributor 102. For example, in one embodiment, content server 106 is configured with the URL or other identifier for an on-premises load balancer. In another embodiment, content server 106 is configured with the URL or other identifier for an ingress service in the cloud. Content server 106, in some embodiments, is also configured with the URLs or other identifiers for the ACS servers.

According to one embodiment, when a user wishes to download a content item, such as a file, from content server 106, client application 100 sends a request to content server 106 and content server 106 returns a target URL. This target URL includes the URL of request distributor 102. In one embodiment, the target URL includes the details of request distributor 102 such as the host and port of a load balancer or an ingress domain of an ingress service. The URL further includes file details, such as the file size and file location.

Client application 100 generates requests to request distributor 102 in separate threads. According to one embodiment, each request is sent in a separate thread. Request distributor 102 distributes the requests or load across the available ACS servers. Since the load is split among the ACS servers, the threads are processed simultaneously, and responses are sent to client application 100 in parallel. All the available resources are effectively utilized, and response time is reduced effectively compared to servicing the requests through a single ACS server.

For example, if a user wishes to download file 120 from content server 106, client application 100 sends a request to content server 106 for file 120. Content server 106 returns the URL of request distributor 102 with file details, such as file size and file location. Client application 100 creates a thread 122 and uses thread 122 to request a first segment of file 120 from request distributor 102. Request distributor 102 redirects the thread to ACS server 104*a* (represented by arrow 124). Based on download splitting criteria, examples of which are discussed below, client application 100 can dedicate additional threads to downloading segments of file 120 as needed (e.g., by creating new threads or utilizing idle threads from thread pool 112). Client application sends requests for the additional segments of file 120 to request distributor 102 using the threads. In FIG. 1B, for example, client application 100 is utilizing three additional threads (thread 126, thread 128, thread 130) to download segments of file 120. Request distributor 102 distributes the servicing of these threads to ACS server 104*b*, ACS server 104*c*, and ACS server 104*d* respectively.

Thread manager 110 can track a variety of metrics. Example metrics include, but are not limited to, a network latency metric, such as connection time (an estimated time for a thread to connect to server and begin downloading content), the content download speeds of threads, remaining content to be downloaded, and other metrics. These metrics may be used to determine whether to split downloading of file 120 using an additional thread.

According to one embodiment, client application 100 determines whether to split the downloading of the content based on a set of factors that includes a network latency metric and a remaining download time to download a remaining amount of the content. Based on a determination to split the downloading of the content, and in parallel to downloading a first part of the content from the server to the client computer, the client application connects to the server and downloads an additional part of the content from the server to the client computer.

According to one embodiment, client application 100 makes the determination to split the downloading of the content based on a remaining download time exceeding a threshold download time. In an even more particular embodiment, the network latency metric comprises a connection time for connecting to the server and the connection time is used as the threshold download time.

In accordance with another embodiment, client application 100 calculates an estimated download time to download the remaining amount of the content by splitting the downloading of the content. In such an embodiment, the determination to split the downloading of the content comprises a determination that the remaining download time exceeds the estimated download time.

Figure 2:
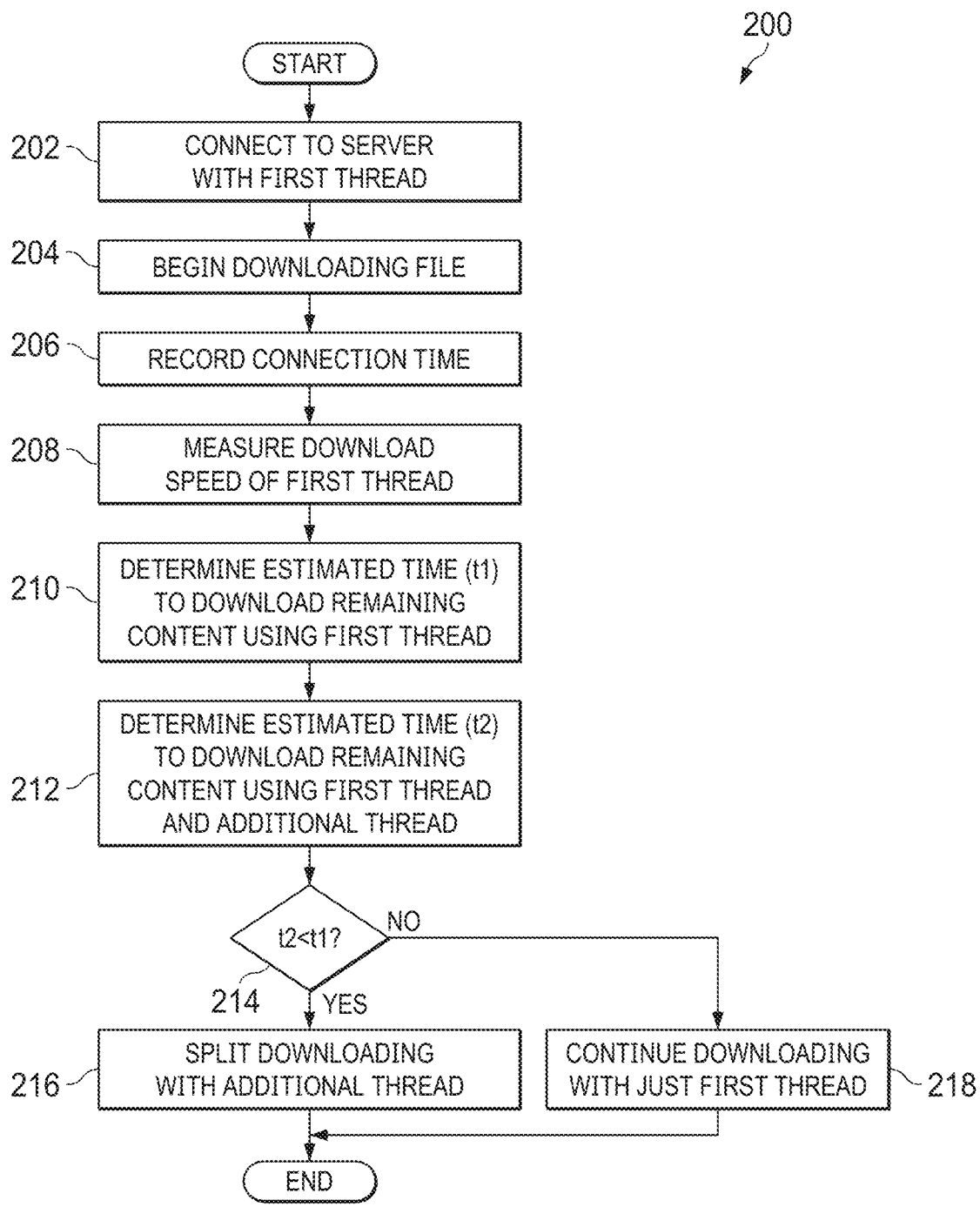
FIG. 2 is a flowchart illustrating one embodiment of a method of splitting a download between multiple parallel threads.

FIG. 2 is a flowchart illustrating one embodiment of a method 200 of splitting a download between multiple parallel threads. In one embodiment, the steps of FIG. 2 may be embodied as computer-executable instructions stored on a non-transitory, computer-readable medium.

Client application 100 uses a first thread to connect to a server to download a file (step 202) and begins downloading a first segment of file 120 (step 204). For example, client application 100 uses thread_1 to connect to ACS server 104a (e.g., via redirection from request distributor 102) (step 202) and begins downloading a first segment of file 120 using thread_1 (step 204). Client application 100 measures the connection time for thread_1 to connect to the server and begin receiving data from file 120 (step 206). The connection time provides a measure of network latency. After a period of downloading content, say one second, client application 100 measures the content download speed of thread_1 (step 208). Client application 100 further determines the remaining content of file 120 to be downloaded and calculates the remaining download time (t1) for thread_1 to download the remaining content (step 210). Client application 100 also determines the estimated download time (t2) it will take to download the remaining content of file 120 if the download is split with an additional thread (thread_2), taking into consideration the estimated connection time and estimated download speed of the additional thread. In some embodiments, the connection time and download speed of thread_1 can be used as the estimated connection time and estimated download speed of thread_2. If t2 is less than t1, as determined at step 214, client application 100 splits the download of the file and creates thread_2 or allocates thread_2 from thread pool 112 to download a second segment of file 120 (step 216). Otherwise, client application 100 continues the download using a single thread (step 218).

As an example, assume file 120 is 800 MB, the connection time of thread_1 is 1 second and, after 1 second of downloading, the download speed of thread_1 is 100 MB/s. Thus, at step 210, client application 100 will determine that the remaining download time for thread_1 is 7 seconds (700 MB remaining/100 MB/s).

At step 212, client application 100 determines the extra content that will be downloaded by thread_1 to cover the network latency (estimated connection time) of thread_2. Here, since the estimated connection time is 1 second, thread_1 will download another 100 MB before thread_2 begins downloading data. The remaining content will be split between thread_1 and thread_2 using an estimated 100 MB/s download time. In this example, it is estimated that thread_1 will download 100 MB of the remaining 700 MB during the estimated 1s connection time of thread_2 and the last 600 MB will be split between thread_1 and thread_2, which will take 3 seconds. Thus, t2 is estimated to be 4 seconds. As t2 is less than t1 in this example, client application 100 will add thread_2 to downloading file 120.

As another example, assume file 120 is 400 MB, the connection time of thread_1 is 3 seconds and, after 1 second of downloading, the download speed of thread_1 is 100 MB/s. Thus, at step 210, client application 100 will determine that the estimated remaining download time for thread_1 is 3 seconds (300 MB remaining/100 MB/s).

At step 212, client application 100 determines the extra content that will be downloaded by thread_1 to cover the network latency (estimated connection time) of thread_2. Here, since the estimated connection time is 3 seconds, thread_1 will download another 300 MB before thread_2 begins downloading data. The remaining content will be split between thread_1 and thread_2 using an estimated 100 MB/s download time. In this example, however, it is estimated that thread_1 will download 300 MB of the remaining 300 MB during the estimated 3s connection time of thread_2. Thus, even if thread_2 is added, t2=3 seconds. Adding thread_2 to the download does not provide any benefit and client application 100 will complete the download using thread_1.

FIG. 2 is merely an illustrative example, and the disclosed subject matter is not limited to the ordering or number of steps illustrated. Embodiments may implement additional steps or alternative steps, omit steps, or repeat steps.

Figure 3:
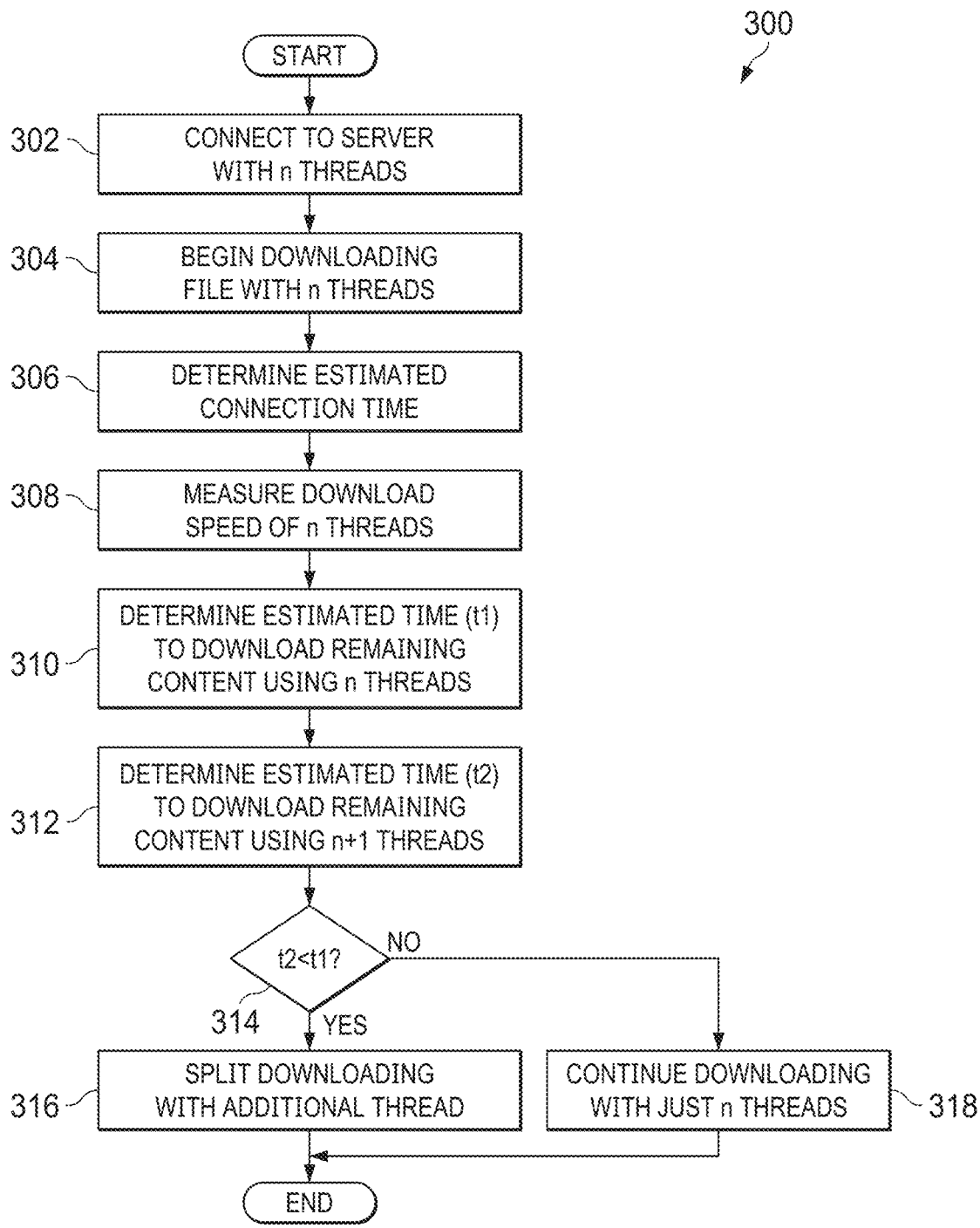
FIG. 3 is a flowchart illustrating one embodiment of a method of splitting a download to use an additional thread.

Method 200 can be extended to the case in which multiple threads are already being used to download a file or other content. FIG. 3, for example, is a flowchart illustrating one embodiment of a method 300 of splitting a download to an additional thread. In one embodiment, the steps of FIG. 3 may be embodied as computer-executable instructions stored on a non-transitory, computer-readable medium.

Client application 100 connects to a server to download a file (step 302) and begins downloading segments of content (e.g., file segments) (step 304) using n threads. It can be noted that the process of connecting to the server and beginning to download segments of content using n threads may be a serial process. For example, client application 100 may use thread_1 to connect to ACS server 104a (e.g., via redirection from request distributor 102) and begin downloading a first segment of file 120 and then add thread_2 to connect to ACS server 104b (e.g., via redirection from request distributor 102) to begin downloading a second segment of file 120.

Client application 100 measures the connection times of the n threads to connect to the server (step 306). The connection time is a measure of network latency, such as the time from issuing a request for a segment of a file 120 in a thread to receiving the first bytes of the segment in the thread. After a period of downloading content in a thread, say one second, client application 100 measures the content download speed of the thread (step 308). Client application 100 determines the remaining content of file 120 to be downloaded and determines the estimated amount of time (t1) for the n threads to download the remaining content (step 310). Client application 100 further determines the estimated amount of time (t2) it will take to download the remaining content of file 120 if the download is split with an additional thread, taking into consideration the estimated connection time and estimated download speed of the additional thread (step 312). In some embodiments, the estimated connection time and estimated download speed of the additional thread can be the average connection time and average download speed of the n threads already being used to download segments of the content. If t2 is less than t1, as determined at step 314, client application 100 splits the download of the file and spawns (or allocates) an additional thread to download a segment of file 120 (step 316). Otherwise, client application 100 continues the download using the n threads (step 318).

FIG. 3 is merely an illustrative example, and the disclosed subject matter is not limited to the ordering or number of steps illustrated. Embodiments may implement additional steps or alternative steps, omit steps, or repeat steps.

In yet other embodiments, the connection time can be used as a threshold download time such that, if t1 exceeds the connection time, client application 100 will split the download.

Figure 4:
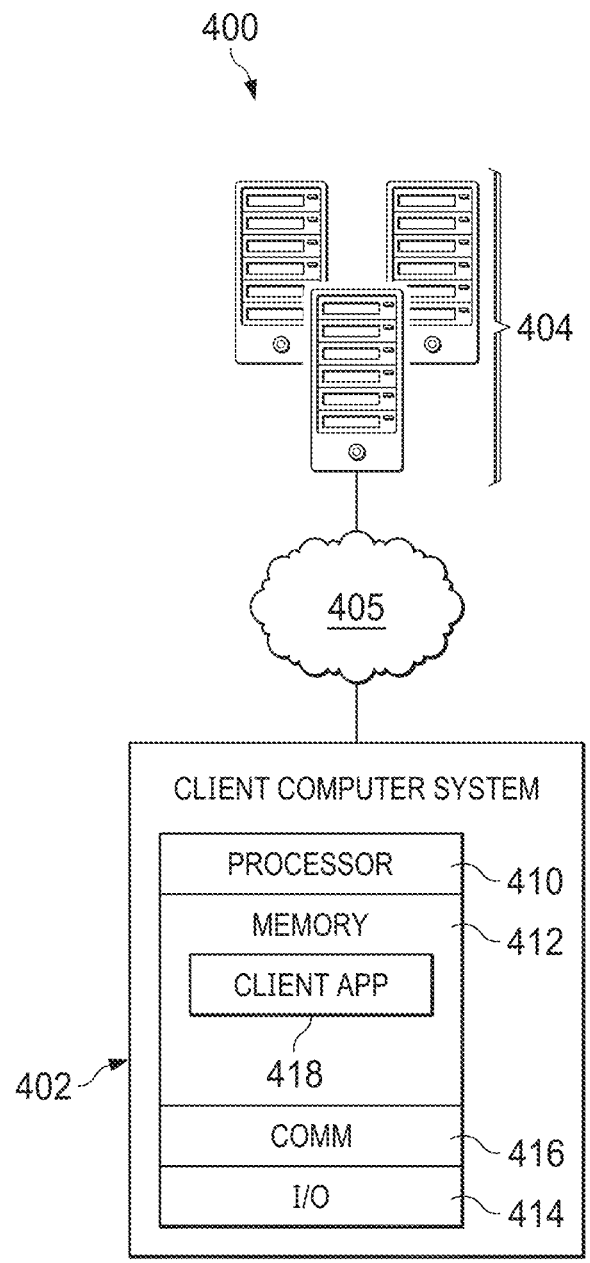
FIG. 4 is a diagrammatic representation of a distributed network computing environment.

FIG. 4 depicts a diagrammatic representation of a distributed network computing environment 400 where embodiments disclosed herein can be implemented. In the example illustrated, network computing environment 400 includes a client computer system 402 coupled to a server computer system 404.

Client computer system comprises a computer processor 410 and associated memory 412. Computer processor 410 may be an integrated circuit for processing instructions, such as, but not limited to a central processing unit (CPU). Memory 412 may include volatile memory, non-volatile memory, semi-volatile memory or a combination thereof. Memory 412, for example, may include RAM, ROM, flash memory, a hard disk drive, a solid-state drive, an optical storage medium (e.g., CD-ROM), or other computer readable memory or combination thereof. Memory 412 implements a storage hierarchy that includes cache memory, primary memory and secondary memory. In some embodiments, memory 412 may include storage space on a data storage array. Client computer system 402 may also include input/output ("I/O") devices 414, such as a keyboard, monitor, printer, electronic pointing device (e.g., mouse, trackball, stylus, etc.), or the like, and a communication interface 416, such as a network interface card, to interface with network 405.

According to one embodiment, client computer system 402 includes executable instructions 418 stored on a non-transitory computer readable medium coupled to computer processor 410. The computer executable instructions of client computer system 402 are executable to provide a client application, such as client application 100, that can download content from a server using parallel threads.

Client computer system 402 can communicate with a server computer system 404 that includes on-premises or remote server computer systems. Server computer system 404 can receive requests from content from client computer system 402 and respond with responsive content. Server computer system 404, according to one embodiment, includes executable instructions stored on a non-transitory computer readable medium to provide a requestor distributor that manages a content repository.

Portions of the methods described herein may be implemented in suitable software code that may reside within RAM, ROM, a hard drive or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer-implemented method for parallel downloading, the method comprising:
   connecting to a server through which a content is available and starting to download the content from the server to a client computer;
   determining whether to split the downloading of the content based on a set of factors, the set of factors comprising:

a network latency metric comprising a connection time for connecting to the server;
a download speed;
an estimated download time to download a remaining amount of the content by splitting the downloading of the content; and
a remaining download time to download the remaining amount of the content; and
based on a determination to split the downloading of the content, wherein the determination to split the downloading of the content comprises a determination that the remaining download time exceeds the estimated download time, and in parallel to downloading a first part of the content from the server to the client computer, connecting to the server and downloading an additional part of the content from the server to the client computer.

2. The computer-implemented method of claim 1, wherein connecting to the server and downloading the first part of the content is performed by a first thread, and wherein connecting to the server and downloading the additional part of the content from the server is performed by a parallel thread that executes in parallel with the first thread.

3. The computer-implemented method of claim 2, wherein the parallel thread is created based on the determination to split the downloading of the content.

4. The computer-implemented method of claim 2, wherein the determination to split the downloading of the content comprises a determination that the remaining download time exceeds a threshold download time.

5. The computer-implemented method of claim 4, wherein the computer-implemented method further comprises using the connection time as the threshold download time.

6. The computer-implemented method of claim 1, wherein the first part of the content is downloaded from a first server and the additional part of the content is downloaded from a second server.

7. A computer program product comprising a non-transitory, computer-readable medium storing instructions executable by a processor to perform parallel downloading, the non-transitory, computer-readable medium comprising instructions for:
connecting to a server through which a content is available and starting to download the content from the server to a client computer;
determining whether to split the downloading of the content based on a set of factors, the set of factors comprising:
a network latency metric comprising a connection time for connecting to the server;
a download speed;
an estimated download time to download a remaining amount of the content by splitting the downloading of the content; and
a remaining download time to download the remaining amount of the content; and
based on a determination to split the downloading of the content, wherein the determination to split the downloading of the content comprises a determination that the remaining download time exceeds the estimated download time, and in parallel to downloading a first part of the content from the server to the client computer, connecting to the server and downloading an additional part of the content from the server to the client computer.

8. The computer program product of claim 7, wherein the first part of the content is downloaded from a first server and the additional part of the content is downloaded from a second server.

9. The computer program product of claim 7, wherein the non-transitory, computer-readable medium further comprises instructions for creating a plurality of threads, wherein connecting to the server and downloading the first part of the content is performed by a first thread, and wherein connecting to the server and downloading the additional part of the content from the server is performed by a parallel thread that executes in parallel with the first thread.

10. The computer program product of claim 9, wherein creating the plurality of threads comprises creating the parallel thread based on the determination to split the downloading of the content.

11. The computer program product of claim 9, wherein the determination to split the downloading of the content comprises a determination that the remaining download time exceeds a threshold download time.

12. The computer program product of claim 11, wherein the connection time is used as the threshold download time.

13. A client-server system comprising:
a server computer system comprising a plurality of servers through which a content is accessible, the server computer system comprising a first processor;
a client computer, the client computer comprising:
a second processor;
a memory storing a client application that is executable by the client computer, the client application comprising instructions for:
connecting to a first server of the plurality of servers and starting to download the content from the first server to the client computer;
determining whether to split the downloading of the content based on a set of factors, the set of factors comprising:
a network latency metric comprising a connection time for connecting to the first server;
a download speed;
an estimated download time to download a remaining amount of the content by splitting the downloading of the content; and
a remaining download time to download the remaining amount of the content; and
based on a determination to split the downloading of the content, wherein the determination to split the downloading of the content comprises a determination that the remaining download time exceeds the estimated download time, and in parallel to downloading a first part of the content from the first server to the client computer, connecting to a second server and downloading an additional part of the content from the second server to the client computer.

14. The client-server system of claim 13, wherein the client application further comprises instructions for:
creating a plurality of threads, wherein connecting to the first server and downloading the first part of the content is performed by a first thread, and wherein connecting to the second server and downloading the additional part of the content from the second server is performed by a parallel thread that executes in parallel with the first thread.

15. The client-server system of claim 14, wherein the parallel thread is created based on the determination to split the downloading of the content.

16. The client-server system of claim 14, wherein the determination to split the downloading of the content comprises a determination that the remaining download time exceeds a threshold download time.

17. The client-server system of claim 16, wherein the connection time is used as the threshold download time.

* * * * *